(12) United States Patent
Iwasa et al.

(10) Patent No.: US 8,349,762 B2
(45) Date of Patent: Jan. 8, 2013

(54) METHOD FOR PRODUCING CATALYST FOR USE IN PREFERENTIAL OXIDATION REACTION OF CARBON MONOXIDE

(75) Inventors: Yasuyuki Iwasa, Tokyo (JP); Takaya Matsumoto, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/262,076

(22) PCT Filed: Feb. 12, 2010

(86) PCT No.: PCT/JP2010/000865
§ 371 (c)(1),
(2), (4) Date: Sep. 29, 2011

(87) PCT Pub. No.: WO2010/113381
PCT Pub. Date: Oct. 7, 2010

(65) Prior Publication Data
US 2012/0040823 A1    Feb. 16, 2012

(30) Foreign Application Priority Data
Mar. 31, 2009    (JP) ................................. 2009-084776

(51) Int. Cl.
*B01J 23/00* (2006.01)
*B01J 21/00* (2006.01)

(52) U.S. Cl. ........ 502/261; 502/262; 502/263; 502/326; 502/327; 502/332; 502/334; 502/339; 502/349; 502/350; 502/351; 502/355; 502/415; 502/439

(58) Field of Classification Search .......... 502/261–263, 502/326–327, 332, 334, 339, 349–351, 355, 502/415, 439
See application file for complete search history.

(56) References Cited

U.S. PATENT DOCUMENTS

| | | | |
|---|---|---|---|
| 2,927,088 A * | 3/1960 | Michalko et al. ............. | 502/334 |
| 3,259,589 A * | 7/1966 | Michalko ...................... | 502/334 |
| 3,367,888 A * | 2/1968 | Hoekstra ....................... | 502/334 |
| 3,898,183 A * | 8/1975 | Sugier et al. .................. | 502/302 |
| 3,931,054 A * | 1/1976 | Lester ........................... | 502/332 |
| 4,495,373 A * | 1/1985 | Niwa et al. .................... | 585/269 |
| 5,068,477 A * | 11/1991 | Berrebi .......................... | 585/274 |
| 5,965,481 A * | 10/1999 | Durand et al. ................. | 502/304 |
| 5,977,012 A * | 11/1999 | Kharas et al. ................. | 502/326 |
| 6,022,825 A * | 2/2000 | Andersen et al. ............. | 502/303 |
| 6,190,430 B1 | 2/2001 | Fukuoka et al. | |
| 6,409,939 B1 | 6/2002 | Abdo et al. | |
| 6,625,976 B1 * | 9/2003 | Andersen et al. ............. | 60/299 |
| 6,660,683 B1 * | 12/2003 | Yaluris et al. ................. | 502/241 |
| 6,670,301 B2 * | 12/2003 | Adzic et al. ................... | 502/185 |
| 6,746,597 B2 * | 6/2004 | Zhou et al. .................... | 208/138 |
| 6,797,667 B2 * | 9/2004 | Ruth et al. ..................... | 502/182 |
| 6,913,738 B1 | 7/2005 | Echigo et al. | |
| 7,067,453 B1 | 6/2006 | Ming et al. | |
| 7,070,757 B2 * | 7/2006 | Fischer et al. ................. | 423/584 |
| 7,247,592 B2 | 7/2007 | Echigo et al. | |
| 7,396,795 B2 * | 7/2008 | Reyes et al. ................... | 502/150 |
| 7,514,476 B2 * | 4/2009 | Parasher et al. ............... | 516/78 |
| 7,541,309 B2 * | 6/2009 | Trevino et al. ................ | 502/325 |
| 7,544,634 B2 | 6/2009 | Echigo et al. | |
| 7,569,508 B2 * | 8/2009 | Zhou et al. .................... | 502/150 |
| 7,601,669 B2 * | 10/2009 | Nakamura et al. ............ | 502/326 |
| 7,632,773 B2 * | 12/2009 | Zhou et al. .................... | 502/152 |
| 7,658,908 B2 | 2/2010 | Echigo et al. | |
| 7,659,224 B2 * | 2/2010 | Shimazaki et al. ........... | 502/180 |
| 7,776,781 B2 * | 8/2010 | Lopez et al. .................. | 502/185 |
| 8,093,178 B2 | 1/2012 | Iwasa et al. | |
| 2001/0000035 A1 * | 3/2001 | Ruhl et al. ..................... | 502/103 |
| 2003/0012719 A1 | 1/2003 | Roos et al. | |
| 2004/0037770 A1 * | 2/2004 | Fischer et al. ................ | 423/584 |
| 2004/0156771 A1 | 8/2004 | Hoshino | |
| 2005/0159306 A1 * | 7/2005 | Kezuka et al. ................ | 502/350 |
| 2006/0263675 A1 * | 11/2006 | Adzic et al. ................... | 429/44 |
| 2007/0026294 A1 * | 2/2007 | Shimazaki et al. ........... | 429/44 |
| 2007/0155626 A1 * | 7/2007 | Yasuda et al. ................. | 502/329 |
| 2008/0234125 A1 * | 9/2008 | Zhang et al. .................. | 502/171 |
| 2009/0286678 A1 * | 11/2009 | Hagemeyer .................... | 502/304 |
| 2010/0113260 A1 * | 5/2010 | Hagemeyer .................... | 502/185 |

FOREIGN PATENT DOCUMENTS

| | | |
|---|---|---|
| EP | 2098291 A1 | 9/2009 |
| JP | 11-086892 A | 3/1999 |
| JP | 2000-262899 A | 9/2000 |
| JP | 2001-017861 A | 1/2001 |
| JP | 2001-212458 A | 8/2001 |
| JP | 2001-219069 A | 8/2001 |
| JP | 2001-239169 A | 9/2001 |

(Continued)

OTHER PUBLICATIONS

Int'l Search Report issued Apr. 6, 2010 in Int'l Application No. PCT/JP2010/000865.
Satoshi Aoyama et al., "CO Selective Oxidation Catalyst for Methanol Fuel Processor", Toyota Technical Review, vol. 48, No. 1, pp. 15, (1998).
U.S. Office Action issued Dec. 27, 2010 in U.S. Appl. No. 12/520,127.

*Primary Examiner* — Cam N. Nguyen
(74) *Attorney, Agent, or Firm* — Panitch Schwarze Belisario & Nadel LLP

(57) ABSTRACT

The present invention provides a method for producing a catalyst for use in preferential carbon monoxide oxidation, which catalyst has a high preferential carbon monoxide oxidation activity and a high methanation activity with respect to the carbon monoxide contained in hydrogen gas, can thus stably reduce the carbon monoxide concentration to an extremely lower level and comprises porous inorganic oxide support particles and, on the basis of the mass thereof, 0.01 to 10 percent by mass of ruthenium and 0.01 to 1 percent by mass of platinum, loaded on the support. The method comprises (1) a step of loading 30 to 70 percent of the total amount of ruthenium to be loaded, on the support particles by a competitive adsorption method and (2) a step of loading the rest of the total amount of ruthenium to be loaded and the total amount of platinum to be loaded, on the ruthenium-loaded support particles produced in step (1) without using a competitive adsorption agent.

7 Claims, No Drawings

FOREIGN PATENT DOCUMENTS

| | | |
|---|---|---|
| JP | 2001-239170 A | 9/2001 |
| JP | 2001-327868 A | 11/2001 |
| JP | 2002-066321 A | 3/2002 |
| JP | 2002-370028 A | 12/2002 |
| JP | 2003-340280 A | 12/2003 |
| JP | 2004-134299 A | 4/2004 |
| JP | 2004-244231 A | 9/2004 |
| JP | 2007-167828 A | 7/2007 |
| WO | 0164337 A1 | 9/2001 |
| WO | 2008075761 A1 | 6/2008 |

* cited by examiner

METHOD FOR PRODUCING CATALYST FOR USE IN PREFERENTIAL OXIDATION REACTION OF CARBON MONOXIDE

CROSS-REFERENCE TO RELATED APPLICATION

This application is a Section 371 of International Application No. PCT/JP2010/000865, filed Feb. 12, 2010, which was published in the Japanese language on Oct. 7, 2010, under International Publication No. WO 2010/113381 A1, and the disclosure of which is incorporated herein by reference.

TECHNICAL FIELD

The present invention relates to a method for producing a catalyst for oxidizing preferentially carbon monoxide in a raw material gas containing hydrogen and carbon monoxide in order to produce a hydrogen-rich gas. More specifically, the present invention relates to a method for producing a catalyst that is improved in carbon monoxide oxidation activity and methanation activity and has a more excellent capability to reduce the carbon monoxide concentration.

BACKGROUND ART

A fuel cell has characteristics that it is high in efficiency because it can take out electric energy directly from free energy changes caused by combustion of fuel. Furthermore, the fuel cell does not discharge any harmful substance and thus have been extended to be used for various purposes. In particular, a polymer electrolyte fuel cell has characteristics that it is high in power density and compact in size and operates at low temperatures.

A fuel gas for a fuel cell generally contains hydrogen as the main component. Examples of the raw material of the fuel gas include hydrocarbons such as natural gas, LPG, naphtha, and kerosene; alcohols such as methanol and ethanol; and ethers such as dimethyl ether. However, carbon atoms in addition to hydrogen atoms are present in the aforesaid raw materials and thus carbon origin impurities can not be avoided from mixing in the fuel gas to be supplied to a fuel cell. Carbon monoxide in particular poisons a platinum group metal used as an electrocatalyst of a fuel cell. If carbon monoxide is present in a fuel gas, the fuel cell would not be able to obtain sufficient power-generating characteristics. In particular, the lower the operating temperature of a fuel cell is, the more carbon monoxide adsorb to a noble metal catalyst, and the more likely the catalyst is poisoned. It is, therefore, indispensable to decrease the concentration of carbon monoxide in the fuel gas for a system using a polymer electrolyte fuel cell.

A typical example of the method for reducing the carbon monoxide concentration in fuel gas is a method, so-called "water-gas-shift reaction" wherein carbon monoxide in a reformed gas produced by reforming a raw material is allowed to react with steam to convert it to hydrogen and carbon dioxide. However, this method can normally reduce the carbon monoxide concentration only down to 0.5 to 1 percent by volume. The carbon monoxide concentration having been reduced to 0.5 to 1 percent by volume by the water-gas-shift reaction is, therefore, required to be further reduced.

A typical example of a method for further reducing the carbon monoxide concentration includes a method wherein molecular oxygen-containing gas is added to gas containing hydrogen and carbon monoxide to oxidize preferentially and convert the carbon monoxide to carbon dioxide or to methanate the carbon monoxide. Alternatively, a two-step method has been proposed, in which carbon monoxide is methanated at the first step and then oxidized at the second step (see Patent Literature 1 below).

However, mere methanation of carbon monoxide causes the loss of hydrogen that will be used as fuel for a fuel cell and thus is not appropriate in view of efficiency. The aforesaid two-step method can not avoid the loss of hydrogen at the first step, either. It is, therefore, adequate to employ a method wherein carbon monoxide is converted to carbon dioxide by preferential oxidation. The key point of this method is how a trace or small amount of carbon monoxide present in an enormously excess amount of hydrogen is preferentially oxidized to be reduced to a level that is preferable for a noble metal catalyst used in a fuel cell. As the result of a recent demand to improve the performance and durability of a fuel cell, the carbon monoxide concentration of a fuel gas has been required to be 5 ppm by volume or less. In contrary to this, it is difficult to reduce the carbon monoxide concentration to the aforesaid level or lower only by oxidation, and it is preferable to methanate carbon monoxide generated upon oxidation. That is, a catalyst is enhanced in not only preferential oxidation activity but also methanation activity with respect to carbon monoxide so that a trace amount of carbon monoxide remaining unreacted is removed by methanation. In this case, the loss of hydrogen due to methanation is little and does not cause any serious problem in efficiency.

A catalyst loading ruthenium or ruthenium and platinum on an inorganic support is known as a catalyst for use in preferential oxidation of carbon monoxide, and a study has been made, which has reported that the performances of the catalyst can be improved by adjusting the distribution of ruthenium and platinum in the support particles. For example, Patent Literature 2 discloses a catalyst wherein 50 percent or more of the value of integral of the total ruthenium concentration distribution is present in a region of ⅓ of the depth in the radius direction from the support particle surface. However, it does not disclose that platinum is further loaded on the catalyst. A catalyst loading only ruthenium but not platinum has a problem that it is difficult to reduce the carbon monoxide concentration to a requisite level (for example, 10 ppm by volume or less) when the molar ratio of molecular oxygen to carbon monoxide ($O_2/CO$) is within a wide range. A catalyst having ruthenium localized on the outer surface of the support particle tends to be reduced in activity with time because the ruthenium is likely to agglomerate though it has a high initial activity.

Patent Literature 3 discloses a catalyst wherein ruthenium and platinum are localized within the range of 100 μm inwardly from the outer surface of an α-alumina support particle. However, when carbon monoxide in hydrogen is preferentially oxidized using such a catalyst, the concentration of the remaining carbon monoxide is reduced to the order of only several tens ppm by volume. This is assumed to be related to the use of the α-alumina support with a relatively small specific surface area. All of these conventional techniques intend to improve an activity for preferential carbon monoxide oxidation by localizing ruthenium (and platinum) in the vicinity of the surface of the support particle at a higher level.

The inventors of the present invention have filed a patent application for a catalyst comprising ruthenium in a specific distribution in the support particle and also loading platinum (see Patent Literature 4). However, a further improvement in catalyst performances has been demanded in conformity with the requests for the improved performances and prolonging the working life of a fuel cell system.

CITATION LIST

Patent Literatures

Patent Literature 1: Japanese Patent Laid-Open Publication No. 11-86892
Patent Literature 2: WO2001/064337
Patent Literature 3: Japanese Patent Laid-Open Publication No. 2001-17861
Patent Literature 4: WO2008/075761

SUMMARY OF INVENTION

Technical Problem

As described above, the development of a catalyst for use in preferential oxidation of carbon monoxide has been demanded, which catalyst removes preferentially a small amount of the carbon monoxide contained in hydrogen gas and has properties to remove carbon monoxide sufficiently and durability to maintain the properties for a long period of time.

The present invention has an object to provide a method for producing a catalyst for use in preferential carbon monoxide oxidation, which has a high preferential carbon monoxide oxidation activity with respect to carbon monoxide contained in hydrogen gas and a high methanation activity with respect to the remaining carbon monoxide and can thus stably reduce the carbon monoxide concentration to an extremely lower level.

Solution to Problem

As the result of extensive research and study by the inventors of the present invention, the present invention has been accomplished on the basis of the finding that in a method for producing a catalyst loading ruthenium and platinum, the loading of these metal components in a specific method can improve the preferential carbon monoxide oxidation activity and methanation activity of the resulting catalyst, and the carbon monoxide concentration in a produced gas can be stably and significantly reduced using the catalyst.

That is, the present invention relates to a method for producing a catalyst for use in preferential carbon monoxide oxidation comprising porous inorganic oxide support particles and, on the basis of the mass thereof, 0.01 to 10 percent by mass of ruthenium and 0.01 to 1 percent by mass of platinum, loaded on the support, wherein the method comprises:

(1) a step of loading 30 to 70 percent of the total amount of ruthenium to be loaded, on the support particles by a competitive adsorption method; and (2) a step of loading the rest of the total amount of ruthenium to be loaded and the total amount of platinum to be loaded, on the ruthenium-loaded support particles without using a competitive adsorption method.

In the method for producing a catalyst of the present invention, the porous inorganic oxide is preferably at least one type selected from the group consisting of alumina, silica, zirconia, and titania.

In the method of the present invention, an organic acid and/or an inorganic acid is preferably used as a competitive adsorption agent in the competitive adsorption method in step (1).

In the method of the present invention, citric acid is preferably used as a competitive adsorption agent in the competitive adsorption method in step (1).

Advantageous Effects of Invention

The use of a catalyst for carbon monoxide preferential oxidation produced by the method of the present invention can preferentially oxidize carbon monoxide in a raw material gas containing hydrogen and carbon monoxide and thus stably reduce the significant amount of carbon monoxide in the gas, resulting in the production of a gas that is suitable as a fuel gas for a fuel cell.

DESCRIPTION OF EMBODIMENTS

No particular limitation is imposed on the porous inorganic oxide used as the support in the method of the present invention. However, the porous inorganic oxide is preferably at least one type selected from the group consisting of alumina ($\alpha$-alumina, $\gamma$-alumina), silica, zirconia and titania. Amongst, preferred is $\gamma$-alumina because of its large specific surface area and high affinity with ruthenium. Preferably, the porous inorganic oxide has an average pore diameter of 6 nm or less.

The support particles of the porous inorganic oxide are preferably particles produced by molding powdery porous inorganic oxide. No particular limitation is imposed on the method for molding. A conventional method such as tablet compression or extrusion may be employed. In view of productivity, extrusion is preferably employed. Upon molding, a binder may be added to the powdery porous inorganic oxide for the purposes of improving moldability and the mechanical strength of the resulting support particles. The binder may be at least one type selected from inorganic oxides such as alumina, silica, zirconia, and titania and is preferably different from the porous inorganic oxide used for the support. Alternatively, a molding auxiliary agent may be added. The molded support particles may be calcined. No particular limitation is imposed on the shape of the support particle, which may be sphere, disc, cylinder, and tube having a section of different shape such as three-leaf or four-leaf shape. No particular limitation is imposed on the size of the support particle. For example, when the particle is spherical, the average diameter thereof is within the range of 1 to 5 mm, more preferably 1 to 3 mm in view of the efficiency of contact with a raw material gas.

In the method of the present invention, the total amount of ruthenium to be loaded on the porous inorganic oxide particles is from 0.01 to 10 percent by mass, preferably from 0.03 to 3 percent by mass on the basis of the mass of the support. When the loading amount is less than 0.01 percent by mass, the resulting catalyst tends to be insufficient in carbon monoxide oxidation activity. When the loading amount is more than 10 percent by mass, a large amount of hydrogen tends to be spent because methanation reaction of carbon monoxide in the raw material gas proceeds with accelerating speed due to the heat generated by methanation.

The amount of ruthenium to be loaded in step (1) in the method of the present invention is from 30 to 70 percent, preferably from 40 to 60 percent of the total amount of ruthenium to be loaded. When the amount of ruthenium to be loaded in step (1) in the method of the present invention is less than 30 percent, ruthenium is likely to be excessively localized on the outer surface of the support particle. When the amount is greater than 70 percent, ruthenium is loaded radially into the interior of the support particle and the amount of ruthenium that is not effectively used tends to increase.

No particular limitation is imposed on the ruthenium source used to load ruthenium in step (1) as long as it is dissolved in solvent, in particular water. The ruthenium source is preferably at least one type of ruthenium compound selected from $RuCl_3 \cdot nH_2O$, $Ru(NO_3)_3$, $K_2(RUCl_5 (H_2O))$, $(NH_4)_2RuCl_6$, $(Ru (NH_3)_6) Br_3$, $Ru(NH_3)_6Cl_3$, $Na_2RuO_4$, $K_2RuO_4$, $Ru(CO)_5$, $[Ru(NH_3)_5Cl]Cl_3$, $Ru_3(CO)_{12}$ and $Ru(C_5H_7O_2)_2$. The ruthenium compound is put in use after dissolved in solvent, preferably water and/or alcohols such as ethanol, more preferably water.

The competitive adsorption agent used to load ruthenium by a competitive adsorption method in step (1) is preferably an organic or inorganic acid. No particular limitation is imposed on the organic or inorganic acid. Examples of the inorganic acid include hydrochloric acid, sulfuric acid, nitric acid, phosphoric acid, and boric acid. Examples of the organic acid include formic acid, acetic acid, propionic acid, valeric acid, lactic acid, butyric acid, oxalic acid, citric acid, and malic acid. Among these acids, citric acid is preferably used in view of its characteristics of the competitive adsorption agent with respect to ruthenium and treatability.

In the competitive adsorption method in step (1), ruthenium is loaded by impregnating porous inorganic oxide support particles with a solution produced by dissolving any of the above-described ruthenium compounds and any of the above-described competitive adsorption agent in water. If ruthenium is loaded by impregnation using no competitive adsorption agent, ruthenium is likely to be loaded locally on the surfaces of the particles. However, loading by the competitive adsorption method allows ruthenium to be loaded more deeply into the interior of the porous inorganic oxide support particle.

The support particles with ruthenium loaded thereon in step (1) are preferably dried to remove the solvent. Any drying method may be employed, such as natural drying in the air, heat drying or deaeration drying under reduced pressure. The support particles with ruthenium loaded thereon are then subjected to step (2).

In step (2) of the method for producing a catalyst of the present invention, the rest of the total amount of ruthenium to be loaded and the total amount of platinum are loaded on the ruthenium-loaded support particles produced in step (1) above without using the competitive adsorption agent. Ruthenium and platinum may be simultaneously loaded using a solution containing ruthenium and platinum sources or may be separately loaded using a solution containing a ruthenium source and a solution containing a platinum source. However, with the objective of simplify the process, simultaneous loading are preferred.

The amount of ruthenium to be loaded in step (2) is the amount derived from subtraction of the amount of ruthenium loaded in step (1) from the predetermined total amount of ruthenium to be loaded and is from 30 to 70 percent, preferably from 40 to 60 percent of the total amount of ruthenium. When the amount of ruthenium is less than 30 percent, ruthenium is loaded radially into the interior of the support particle and the amount of ruthenium that is not effectively used tends to increase. When the amount is greater than 70 percent, ruthenium is likely to be localized excessively on the outer surface of the support particle.

The ruthenium source used for loading ruthenium in step (2) is preferably the ruthenium compound that is the same as that used in step (1).

The amount of platinum to be loaded in step (2) is from 0.01 to 1 percent by mass, preferably from 0.01 to 0.1 percent by mass, on the basis of the total mass of the porous inorganic support. When the loading amount is less than 0.01 percent by mass, it is likely that sufficient catalyst properties for carbon monoxide oxidation is not obtained. Meanwhile, when the loading amount is more than 1 percent by mass, it tends to be difficult to reduce the carbon monoxide concentration.

The platinum source used to load platinum in step (2) is at least one type of platinum compound such as $PtCl_2$, $K_2PtCl_4$, $K_2PtCl_6$, $H_2PtCl_6$, $(NH_4)_2PtCl_6$, $H_2Pt(OH)_6$, $Pt(NH_3)_4Cl_2 \cdot H_2O$ and $Pt(C_5H_7O_2)_2$.

In step (2), ruthenium and platinum are preferably loaded using a solution, preferably aqueous solution containing at least one type of the above-described ruthenium compounds and at least one type of the above-described platinum compounds by impregnation or equilibrium adsorption not using the above-described competitive adsorption agent. The use of impregnation or equilibrium adsorption without using a competitive adsorption agent allows platinum and ruthenium to be loaded locally in the vicinity of the outer surface of the porous inorganic support particle.

Chloride ions originating from the metal sources or support may possibly remain in the support particles with ruthenium and platinum loaded through steps (1) and (2). The remaining chloride ions possibly facilitate the loaded metals to agglomerate and thus cause a reduction in catalyst activity. The concentration of the chloride ions thus needs to be 100 ppm by mass or less, preferably 80 ppm by mass or less, particularly preferably 50 ppm by mass or less. Calcination in the air performed to remove anions such as chlorine from a catalyst containing ruthenium causes problems that a toxic ruthenium oxide is generated and the loaded ruthenium decreases because the ruthenium oxide sublimates. Generally, calcination in the air is thus not carried out during the preparation of a catalyst containing ruthenium, and a step of removing anions with a basic solution is provided. The anion removal step is usually carried out by treating a catalyst with an alkali solution of sodium hydroxide or the like.

The support particles with ruthenium and platinum loaded thereon in step (2) are dried in the same manner as in step (1) to remove the solvent.

The catalyst produced as described above is preferably subjected to a reduction treatment for activation. The reduction treatment may be a gas phase reduction using hydrogen gas or a liquid phase reduction using a reducing agent such as $NaBH_4$. The gas phase reduction is preferably carried out at a temperature of 300 to 800° C. under a hydrogen atmosphere for 1 to 5 hours. When the liquid phase reduction is carried out, it may cause the catalyst to be inactivated on the surface layer thereof due to contact with air after the reduction treatment. In this case, preferably the catalyst is filled into a reactor and subjected to a reduction treatment under hydrogen atmosphere for example at a temperature of 150 to 250° C. for 1 to 5 hours for reactivation.

In the case where the order of steps (1) and (2) is reversed, i.e., a method is employed wherein ruthenium is loaded by impregnation without using a competitive adsorption agent, and then ruthenium and platinum are loaded by a competitive adsorption method, the resulting catalyst can not be improved in properties.

It is assumed that the catalyst produced by the method of the present invention comprise ruthenium distributed in the interior and vicinity of the outer surface of the support particle and platinum distributed locally in the vicinity of the outer surface of the support particle. It is also assumed that due to these metal distributions, the catalyst have a high preferential oxidation activity with respect to carbon monoxide in a raw material gas containing hydrogen and carbon monoxide and high methanation activity to the remaining carbon monoxide.

Therefore, when the catalyst is brought into contact with the raw material gas, the carbon monoxide contained therein can be significantly decreased.

Contact of the catalyst produced by the method of the present invention with a raw material gas containing hydrogen and carbon monoxide and a gas containing molecular oxygen supplied to oxidize the carbon monoxide can reduce the carbon monoxide in the raw material gas.

The carbon monoxide concentration of the raw material gas is usually from 0.1 to 2 percent by volume. Whilst, the hydrogen concentration of the gas is usually from 40 to 85 percent by volume. The raw material gas may contain nitrogen, carbon dioxide, steam and the like in addition to carbon monoxide and hydrogen.

No particular limitation is imposed on the gas containing molecular oxygen supplied for carbon monoxide oxidation. Examples of the gas include air and oxygen. No particular limitation is imposed on the molar ratio of the oxygen in the oxygen-containing gas supplied for carbon monoxide oxidation to the carbon monoxide in the raw material gas ($O_2/CO$). For example, when the carbon monoxide concentration of the raw material gas is 0.5 percent by volume, the molar ratio is preferably within the range of 0.5 to 2.5. When the $O_2/CO$ is less than 0.5, oxidation of carbon monoxide may not proceed sufficiently because oxygen runs short stoichiometrically. When the $O_2/CO$ is greater than 2.5, the hydrogen concentration is decreased, due to oxidation of hydrogen, the reaction temperature increases due to the heat generated by the oxidation of hydrogen, and side reactions such as production of methane is likely to occur.

When a raw material gas is brought into contact with an oxygen-containing gas in the presence of the catalyst produced by the method of the present invention to oxidize preferentially carbon monoxide, the reaction pressure is preferably from atmospheric pressure to 1 MPa, particularly preferably from atmospheric pressure to 0.2 MPa, taking account for the economic efficiency and safeness of a fuel cell system. No particular limitation is imposed on the reaction temperature as long as it is a temperature at which the carbon monoxide concentration can be reduced. However, a too low temperature causes a slow reaction rate while a too high temperature causes a reduction in selectivity. The temperature is thus preferably from 80 to 350° C., more preferably from 100 to 300° C. An excessively too high GHSV causes the oxidation reaction of carbon monoxide to unlikely proceed. A too low GHSV causes an apparatus to be too large. Therefore, the GHSV is preferably from 1,000 to 50,000 $h^{-1}$, particularly preferably from 3,000 to 30,000 $h^{-1}$.

EXAMPLES

Hereinafter, the present invention will be described in more details by way of the following examples and comparative examples, which should not be construed as limiting the scope of the invention.

Example 1

[Preparation of Catalyst]

Commercially available support particles (spherical molded particles having a diameter of 1 to 2 mm) of γ-alumina were impregnated with a solution prepared by dissolving in ion-exchange water ruthenium chloride in an amount of 0.25 percent by mass in terms of metal ruthenium on the basis of the support mass and citric acid, which is a competitive adsorption agent, in an amount of 20 percent by mass of the amount corresponding to the water absorption amount of the support so that the ruthenium component was loaded on the support particles. Thereafter, the support particles were dried in the air at a temperature of 120° C. for 12 hours to remove the moisture.

Subsequently, the support particles containing ruthenium loaded therein were impregnated with a solution (containing no competitive adsorption agent) prepared by dissolving in ion-exchange water ruthenium chloride in an amount of 0.25 percent by mass in terms of metal ruthenium and chloroplatinic acid in an amount of 0.02 percent by mass in terms of metal platinum, on the basis of the support mass so that the ruthenium and platinum components were loaded on the support particles. The ruthenium and platinum components were rendered insoluble and fixed using an aqueous solution containing sodium hydroxide in an amount of 10 percent by mass of the amount corresponding to the water absorption amount of the support, and then liquid-reduced with a $NaBH_4$ solution and washed with water so as to remove the anions. The support particles were dried under the same conditions as the above to remove the moisture thereby producing Catalyst A.

(Preferential Oxidation Reaction of Carbon Monoxide)

Into a stainless steel reactor having an inner diameter of 12.7 mm and a length of 300 mm were filled 12 ml of Catalyst A, so as to form a fixed catalyst bed. The reactor was incorporated in a continuous flow type reaction apparatus, and a reduction treatment for the catalyst was carried out while hydrogen was flowed at a temperature of 200° C. for one hour.

Thereafter, the reactor was supplied with a raw material gas that is a mixed gas of hydrogen ($H_2$: 55.5 percent by volume), carbon monoxide (CO: 5,000 ppm by volume), carbon dioxide ($CO_2$: 24 percent by volume), and steam ($H_2O$: 20 percent by volume), and air so as to oxidize preferentially the carbon monoxide. The reaction conditions are those wherein the GHSV was 8000 $h^{-1}$ and the reaction temperature was 140° C. (temperature at the catalyst layer inlet). The molar ratio of the oxygen in the air to the carbon monoxide in the raw material gas was adjusted to be 2:1. When a predetermined time period elapsed from the initiation of the reaction, the composition of the gas at the downstream end of the reactor was analyzed with a TCD gas chromatography. The result is set forth in Table 1 below. The supply rate of air was adjusted so that the molar ratio of the $O_2$ to the carbon monoxide in the raw material gas ($O_2/CO$) was 2.5, and the reaction was then initiated. After 30 minutes at which the reaction became stable, the carbon monoxide concentration of the discharged gas at the outlet of the reaction tube was measured. Thereafter, the supply rate of air was decreased so that the $O_2/CO$ was 2.4. After another 30 minutes at which the reaction became stable, the CO concentration of the discharged gas at the outlet of the reaction tube was measured. Thereafter, in the same manner, the supply rate of air was decreased so that the $O_2/CO$ was decreased by 0.1, and every time the ratio was decreased by 0.1, the CO concentration of the discharged gas at the outlet of the reaction tube was measured. This procedure was repeated until the $O_2/Co$ was 0.9, and when the predetermined time elapsed, the composition of the gas at the downstream end of the reactor was analyzed with a TCD gas chromatography. The $O_2/CO$ at which the carbon monoxide concentration of the discharged gas at the outlet of the reactor was 10 ppm by volume was defined as the lower limit of the $O_2/CO$. The results are also set forth in Table 1.

Comparative Example 1

[Preparation of Catalyst]

A solution was prepared by dissolving in ion-exchange water ruthenium chloride in an amount of 0.5 percent by mass in terms of metal ruthenium and chloroplatinic acid in an amount of 0.02 percent by mass in terms of metal platinum, on the basis of the support mass. Support particles that are the same as those used in Example 1 were impregnated with the solution so that the ruthenium and platinum components were loaded. The resulting particles were alkali-treated, liquid-reduced, water-washed, and dried in the same manner as in Example 1 thereby producing Catalyst B.

(Preferential Oxidation Reaction of Carbon Monoxide)

Preferential oxidation reaction of carbon monoxide was carried out with the same procedures of Example 1 except for using Catalyst B instead of Catalyst A. The results are set forth in Table 1.

Comparative Example 2

[Preparation of Catalyst]

A solution was prepared by dissolving in ion-exchange water ruthenium chloride in an amount of 0.5 percent by mass in terms of metal ruthenium and chloroplatinic acid in an amount of 0.02 percent by mass in terms of metal platinum, on the basis of the support mass, and citric acid in an amount of 20 percent by mass of the amount corresponding to the water absorption amount of the support. Support particles that are the same as those used in Example 1 were impregnated with the solution so that the ruthenium and platinum components were loaded. The resulting particles were alkali-treated, liquid-reduced, water-washed, and dried in the same manner as in Example 1 thereby producing Catalyst C.

(Preferential Oxidation Reaction of Carbon Monoxide)

Preferential oxidation reaction of carbon monoxide was carried out with the same procedures of Example 1 except for using Catalyst C instead of Catalyst A. The results are set forth in Table 1.

Comparative Example 3

[Preparation of Catalyst]

A solution was prepared by dissolving in ion-exchange water ruthenium chloride in an amount of 0.25 percent by mass in terms of metal ruthenium and chloroplatinic acid in an amount of 0.02 percent by mass in terms of metal platinum, on the basis of the support mass, and citric acid in an amount of 20 percent by mass of the amount corresponding to the water absorption amount of the support. Support particles that are the same as those used in Example 1 were impregnated with the solution so that the ruthenium and platinum components were loaded. The support particles were dried in the same manner as in Example 1.

Subsequently, the support particles containing ruthenium loaded therein are impregnated with a solution (containing no competitive adsorption agent) prepared by dissolving in ion-exchange water ruthenium chloride in an amount of 0.25 percent by mass in terms of metal ruthenium on the basis of the support mass so that the ruthenium component was loaded. The resulting particles were alkali-treated, liquid-reduced, water-washed, and dried in the same manner as in Example 1 thereby producing Catalyst D.

(Preferential Oxidation Reaction of Carbon Monoxide)

Preferential oxidation reaction of carbon monoxide was carried out with the same procedures of Example 1 except for using Catalyst D instead of Catalyst A. The results are set forth in Table 1.

TABLE 1

| | Catalyst | Carbon Monoxide Cocentration (vol. ppm) | Methane Concentration (vol. ppm) | $O_2/CO$ Lower Limit |
|---|---|---|---|---|
| Example 1 | A | 1.4 | 3520 | 1.1 |
| Comparative Example 1 | B | 6.7 | 1890 | 1.4 |
| Comparative Example 2 | C | 4.7 | 2370 | 1.6 |
| Comparative Example 3 | D | 2.6 | 3400 | 1.3 |

As apparent from the results set forth in Table 1, the carbon monoxide concentration was able to be able to be reduced to 1 ppm by volume that is an extremely low level by loading part of the ruthenium component by a competitive adsorption method and loading part of the ruthenium component and the platinum component without using a competitive adsorption method.

Industrial Applicability

The catalyst produced by the method of the present invention can oxidize preferentially the carbon monoxide in a raw material gas containing hydrogen and carbon monoxide and thus can reduce significantly the carbon monoxide concentration so as to produce a gas that is suitable as a fuel gas for a fuel cell.

The invention claimed is:

1. A method for producing a catalyst for use in preferential carbon monoxide oxidation comprising porous inorganic oxide support particles and, on the basis of the mass thereof, 0.01 to 3 percent by mass of ruthenium and 0.01 to 1 percent by mass of platinum, loaded on the support, wherein the method comprises:
   (1) a step of loading 30 to 70 percent of the total amount of ruthenium to be loaded on the support particles using a competitive adsorption agent; and
   (2) a step of loading the rest of the total amount of ruthenium to be loaded and the total amount of platinum to be loaded on the ruthenium-loaded support particles without using a competitive adsorption agent.

2. The method for producing the catalyst for use in preferential carbon monoxide oxidation according to claim 1, wherein the porous inorganic oxide is at least one selected from the group consisting of alumina, silica, zirconia, and titania.

3. The method for producing the catalyst for use in preferential carbon monoxide oxidation according to claim 2, wherein an organic acid and/or an inorganic acid is used as the competitive adsorption agent in step (1).

4. The method for producing the catalyst for use in preferential carbon monoxide oxidation according to claim 2, wherein citric acid is used as the competitive adsorption agent in step (1).

5. The method for producing the catalyst for use in preferential carbon monoxide oxidation according to claim 1, wherein an organic acid and/or an inorganic acid is used as the competitive adsorption agent in step (1).

6. The method for producing the catalyst for use in preferential carbon monoxide oxidation according to claim 5, wherein citric acid is used as the competitive adsorption agent in step (1).

7. The method for producing the catalyst for use in preferential carbon monoxide oxidation according to claim 1, wherein citric acid is used as the competitive adsorption agent in step (1).

* * * * *